Figure 1:
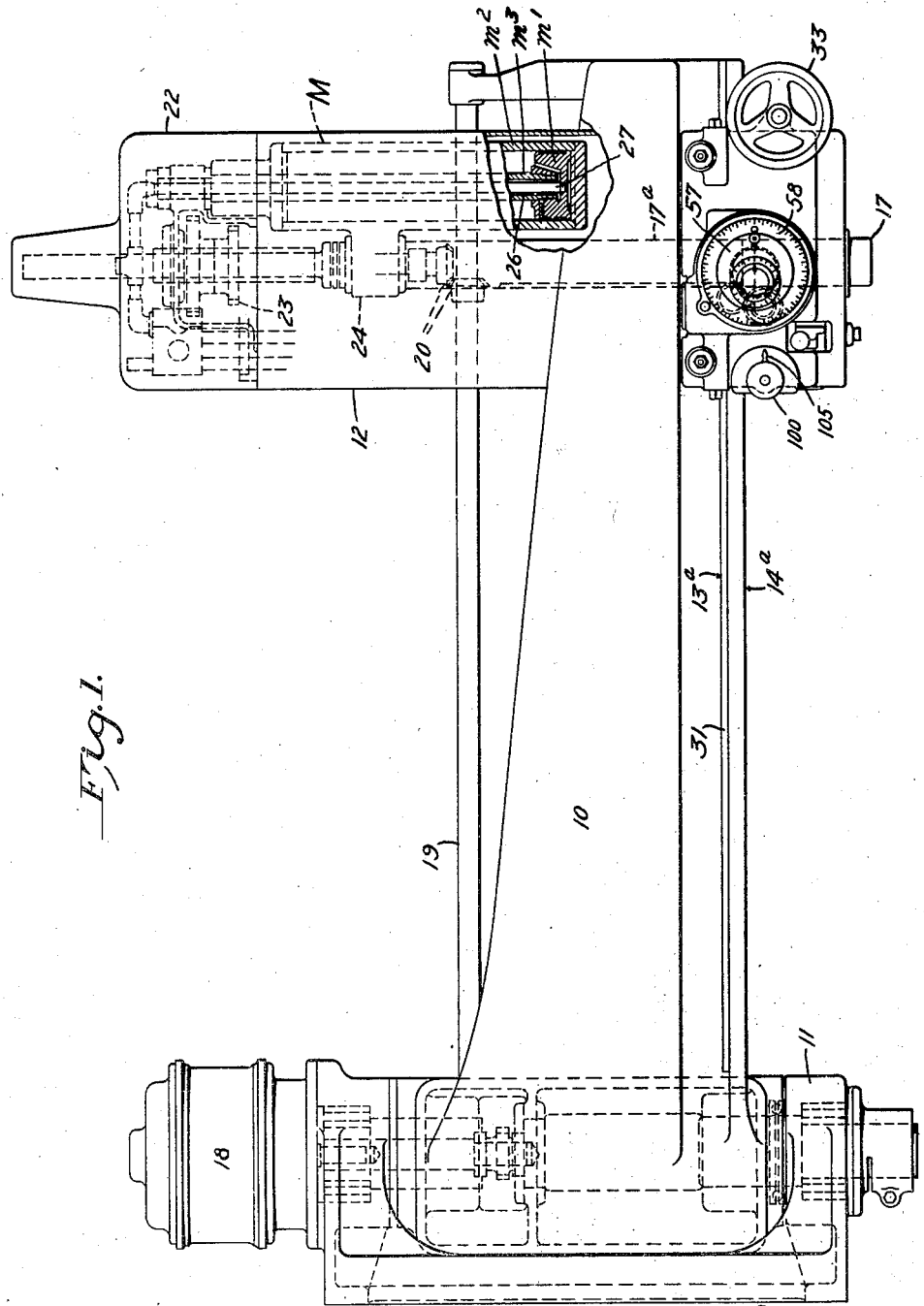

May 7, 1935.  L. L. SCHAUER ET AL  2,000,420
HYDRAULIC TRANSMISSION SYSTEM
Filed April 30, 1931  7 Sheets-Sheet 3

Inventors
Lawrence L. Schauer
Augustus M. Sosa
By Attorneys John N. McKewen
Nathan, Bowman & Helfrich

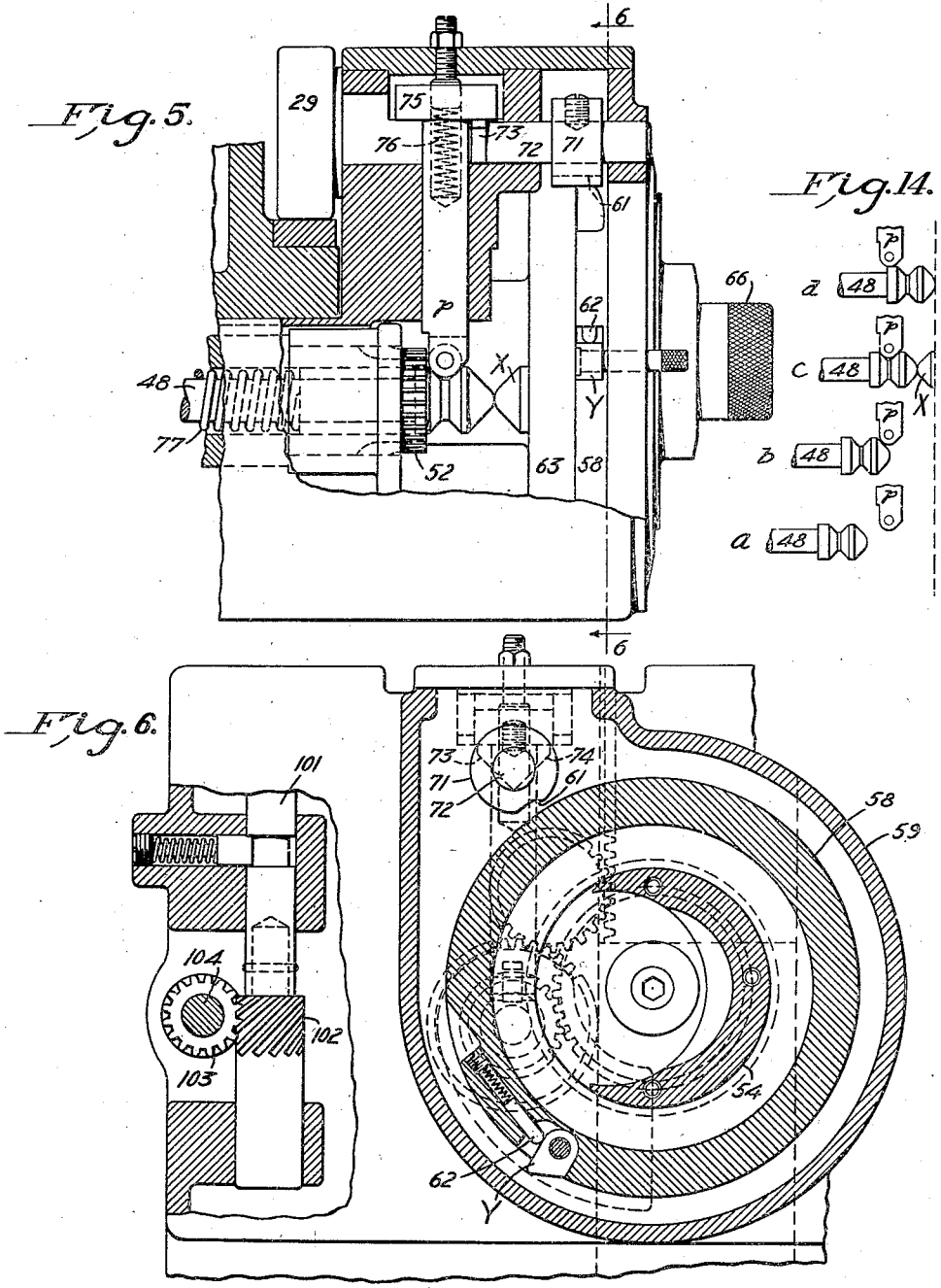

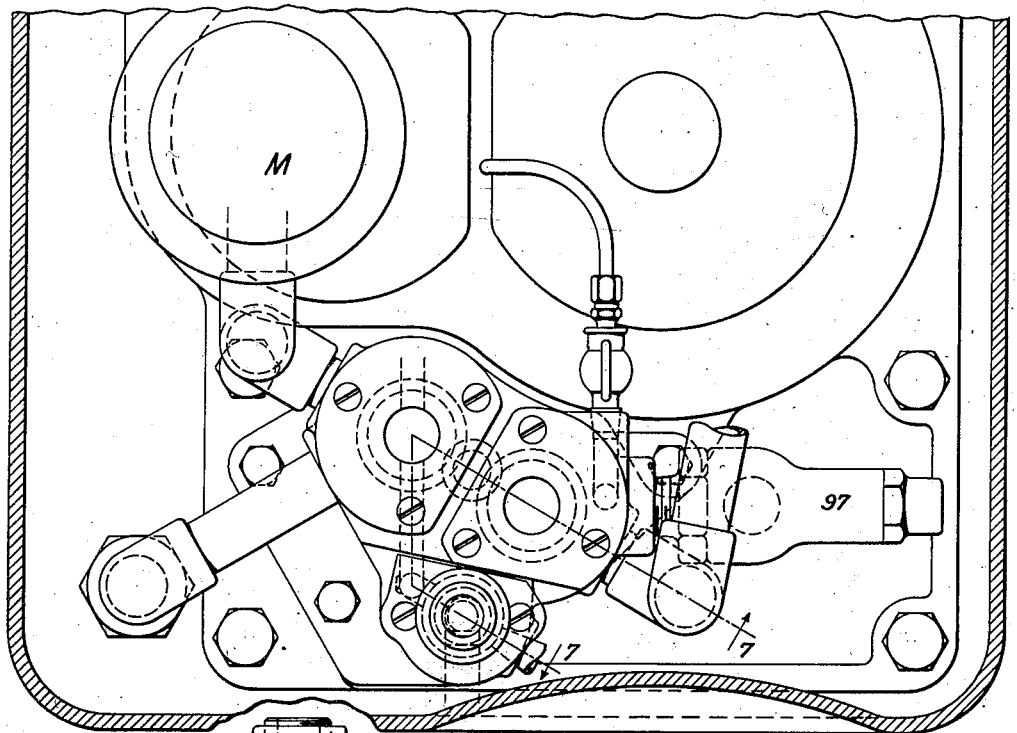
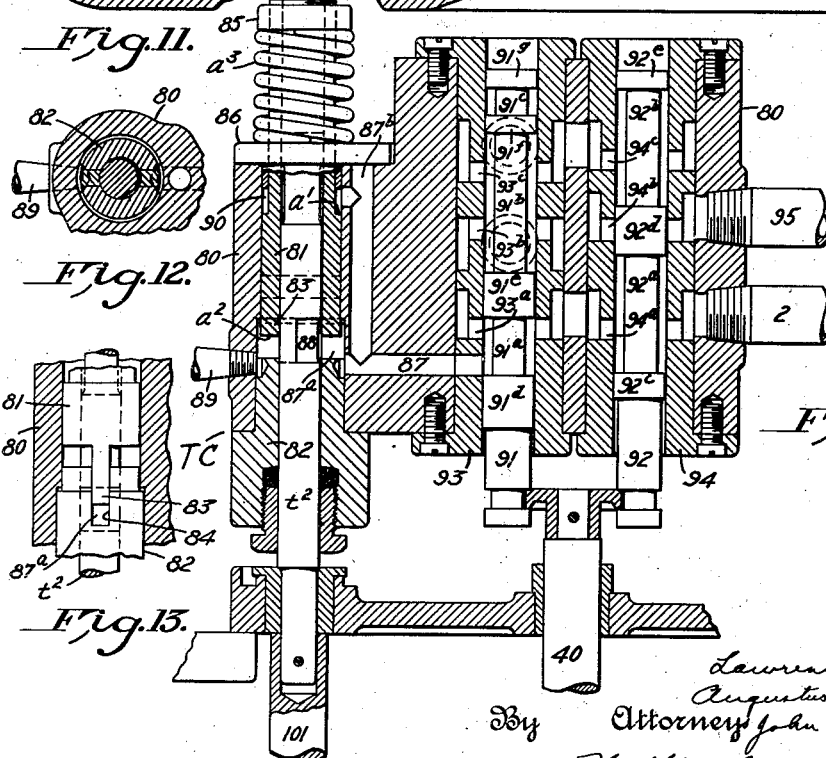

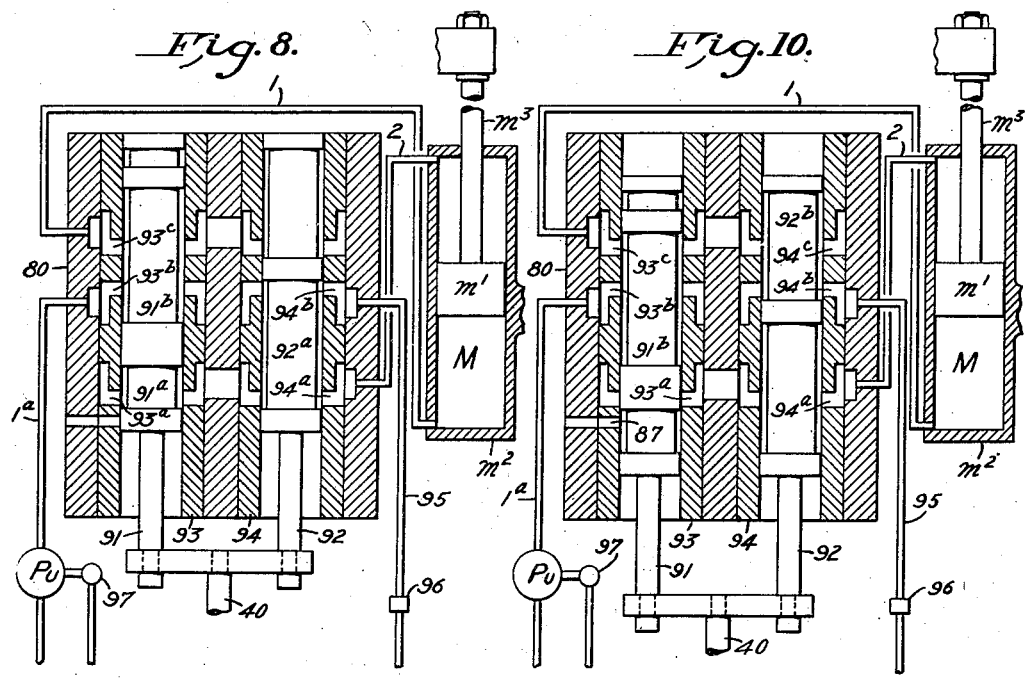

Patented May 7, 1935

2,000,420

UNITED STATES PATENT OFFICE 2,000,420

HYDRAULIC TRANSMISSION SYSTEM

Lawrence L. Schauer, Augustus M. Sosa, and John H. McKewen, Cincinnati, Ohio, assignors to The Cincinnati Bickford Tool Company, Cincinnati, Ohio, a corporation of Ohio Application April 30, 1931, Serial No. 534,032

12 Claims. (Cl. 60—52)

This invention concerns hydraulically propelled metal cutting machine tools and relates more particularly to those types of machines with which drilling, boring, facing, and reaming operations are performed.

It has for its primary object to provide the hydraulic circuit of a machine tool with means for compensating for the variations in flow of the pressure fluid under variable conditions of pressure, thereby to produce a constant rate of feed or traverse of the driven element, irrespective of variations in value of the work resistance encountered during the continuance of the tooling operation.

One of the chief difficulties encountered in adaping hydraulics to machine tools is in maintaining a constant rate of feed under varying working conditions. A number of factors contribute to bring about an unsteady and non-uniform movement of the driven element, the main one being that a larger quantity of fluid, per unit of time, will pass a resistance or throttle under a high pressure than will pass the same resistance under a lower pressure. Consequently, if a conventional throttle valve is employed to regulate the feed rate, and whether it be placed in the forward pressure line or back pressure line, there will be variations in the quantities of fluid passing the control element which will vary proportionately with the work resistance or the tooling stresses encountered.

This invention proposes a means for automatically varying or adjusting the effectiveness of the control valve to compensate for and maintain a constant flow therethrough under varying pressure conditions for any given setting. If the volume of fluid passing the throttle is held constant, as above mentioned, a definite predetermined rate of movement of the propelled element or elements is assured.

Another object of this invention is to provide a machine with an hydraulic driving means and to arrange the controls therefor in a manner whereby they may be operable with equal ease from either the front or rear of the machine. The advantages of such an arrangement of controls are apparent when one considers the amount of time and energy saved to the user in setting up for and performing a given tooling operation upon a particular work-piece.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
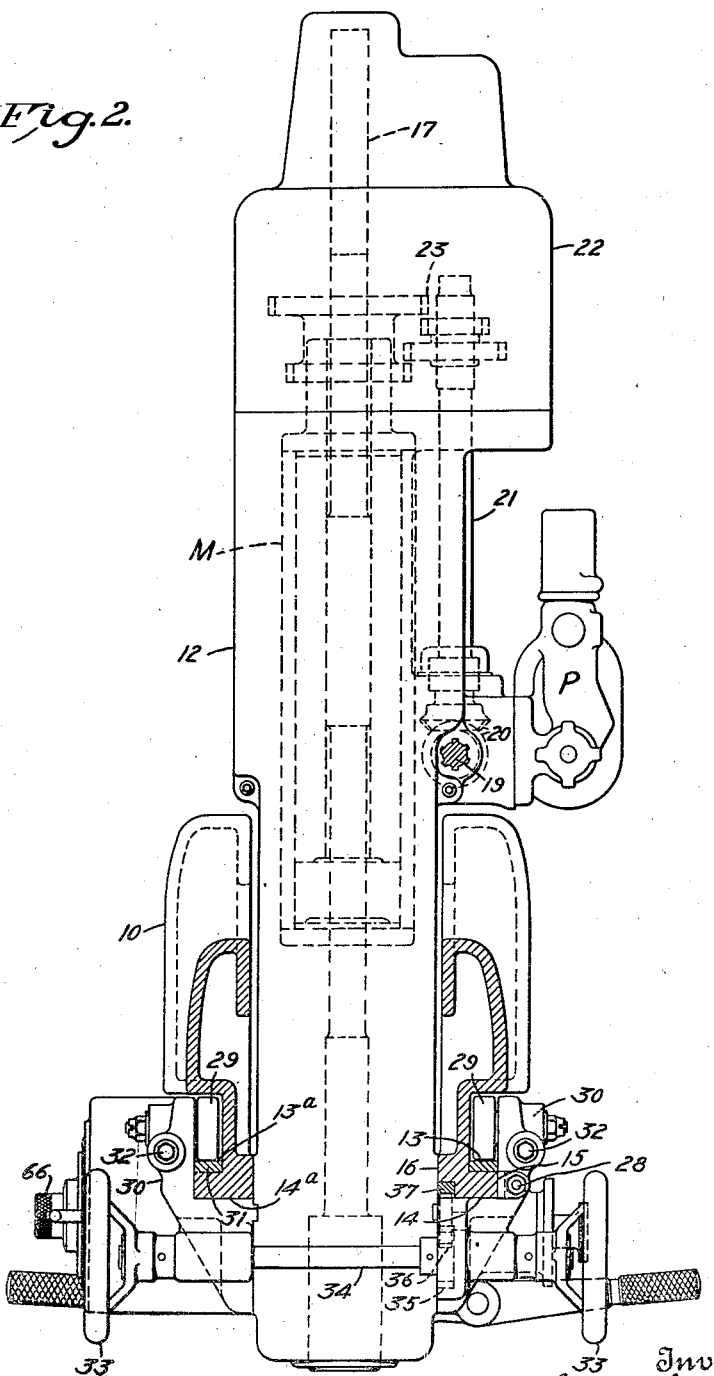
Figure 3:
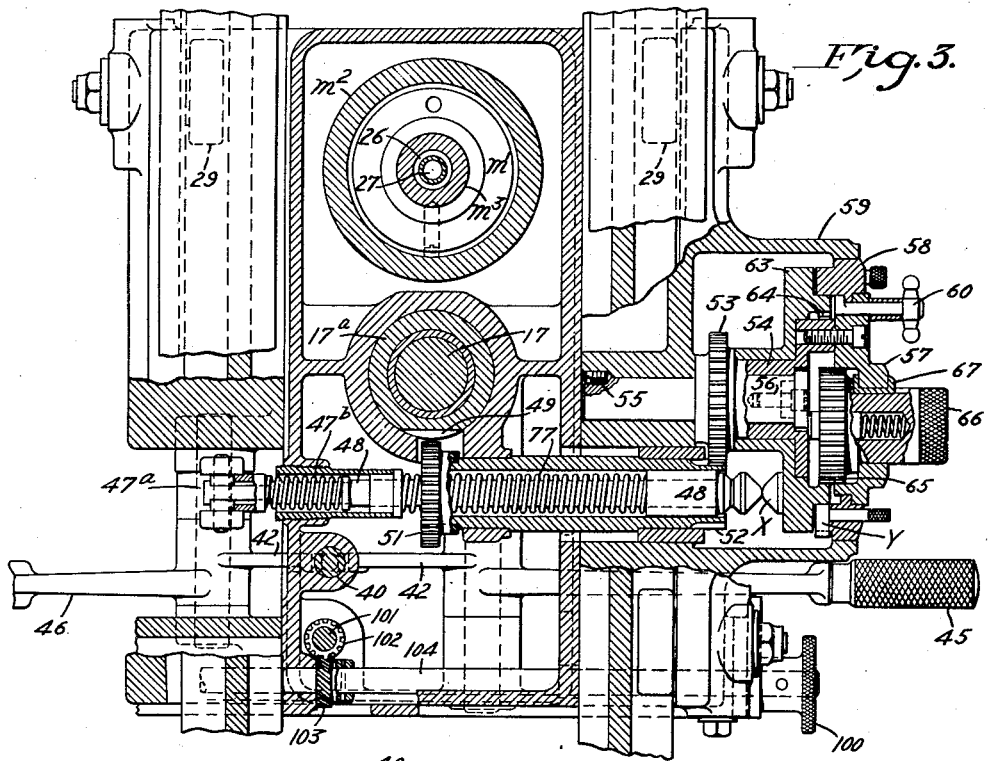
Figure 4:
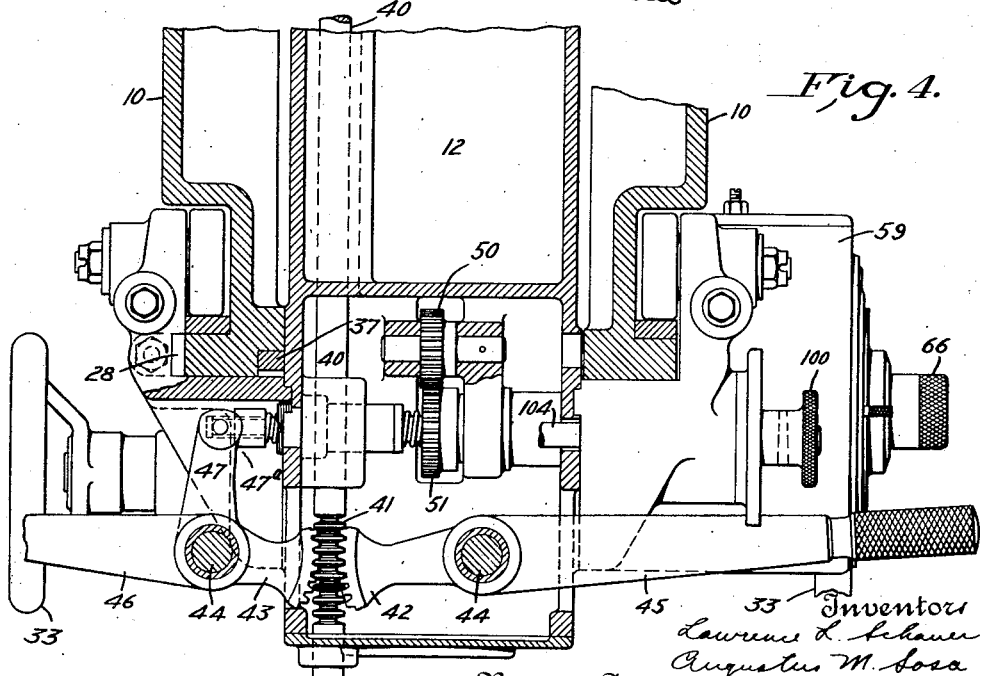

Figure 1 indicates a representative type of a radial drilling machine embodying this invention. Fig. 2 is an end view thereof, partly in section, better to illustrate the arrangement of the guides and rollers which support the tool head. Fig. 3 is a horizontal section through the feed dial illustrating the parts in a neutral or stop position. Fig. 4 is a side view of a portion of the head partly in section illustrating parts of the control mechanism. Fig. 5 is a fragmentary view partly in section, of the controller and the trip latch mechanism in the positions assumed when the tool spindle is at rest. Fig. 6 is a sectional view through line 6—6 of Fig. 5, illustrating the relative positions of the tripping dogs. Fig. 7 is a development of the valve structures along the line 7—7 of Fig. 11 and illustrates the position of the valves in the "feed" position. Fig. 8 is a diagrammatic view of the valves and connections to the pump and motor, the valves being positioned so as to effect a forward or approach movement of the spindle. Fig. 9 is a diagrammatic view, illustrating a position of the valves during the return movement of the spindle. Fig. 10 is a view similar to Fig. 9 but showing the position of the valves during the neutral position. Fig. 11 is a plan view of a portion of the drill head illustrating the relative positions of the control valves with respect to the tool spindle and hydraulic motor. Figs. 12 and 13 are detail sectional views of portions of the throttling device. Fig. 14 is a diagrammatic illustration of the respective positions assumed by the controller shaft during a normal cycle of operation. Figs. 15, 16, 17 and 18 are analytic diagrams of the hydraulic circuit.

Referring more particularly to Fig. 1, it will be noted that the radial drill therein shown is adaptable for mounting on a vertical wall or support and at whatever height desired. It will be understood, however, that the arm may be rotatably mounted on a post or column as is conventional with this type of machine and that the drawings forming a part of this disclosure are merely representative of one form.

In this disclosure the arm 10 is journaled in a bracket 11 so as to swing laterally over the workpieces. A drill head 12 is guided along the arm by guideways 13, 14, 15 and 16 and carries a rotatable and translatable spindle 17 journaled therein. Power to rotate the spindle comes from a prime mover 18, or other suitable source, to the arm shaft 19, thence through the bevel gears 20, or reversing clutch if the arm shaft is unidirectional, to the drive shaft 21 that enters the head. A speed change gear box 22, carried in the head, houses suitable change gears, indicated generally as 23, for driving the spindle 17 at various speeds.

Power for effecting translatory movements of the spindle is provided by a hydraulic motor M which comprises a piston $m^1$ and a cylinder $m^2$. One of the elements of the motor, preferably the cylinder $m^2$, is connected as by the bracket 24 to the spindle sleeve 17ª. The piston rod $m^3$ is rigidly connected to a portion of the drill head and is provided with double fluid conduits 26 and 27. One conduit 26 connects with the smaller end of the motor (the end that the piston rod occupies) while the other conduit 27 connects with the larger end of the motor (see Fig. 1). Fluid under pressure for actuating the motor is supplied by a pump P selectively to either end of the motor as will later be described. It may be noted here that by providing a hydraulic motor for translating the spindle a large number of costly change gears have been eliminated and in the absence of change gears ample room is provided within the head for a reservoir, motor, cylinder, etc.

Referring to Fig. 2, it will be noted that the guideways for the head are formed at the lower edges of the bifurcated arm and for supporting and guiding the head at the lowermost position adjacent the portions receiving the tooling stresses. Narrow guides 15 and 16, extending longitudinally of the arm, take the lateral thrusts, guideways 13 and 14 and 13ª and 14ª take the vertical thrusts, and in addition, prevent the head from tipping front to back. In this manner, it will be seen, that the head and spindle are supported and accurately guided under all conditions.

The entire weight of the head is carried by rollers 29, positioned on either side of the head and at the extreme points thereof, and which are eccentrically mounted and adjustable in the brackets 30. Wear plates 31, detachably secured to the arm-ways, provide accurate and aligned surfaces upon which the head rollers bear. Upward thrusts upon the spindle are transmitted directly to the lower guide or guides 14 and 14ª which afford a positive metal to metal contact with the bracket members 30 when under loads. Wear on the square locked guides is readily compensated for by adjusting the gib 28 which corrects for any lateral misalignment of the carrier, and by adjusting the rollers 29 by means of the screws 32, correction may be made for any wear on the guides 13—14 or 13ª—14ª or error in the vertical alignment of tool head. Thus it will be seen that the low square locked guides result in a low hung head and provide the accurate supporting surfaces necessary for machines of the character and which may be easily and accurately machined with a minimum of expense.

Mounting the head on rollers has the additional advantage of minimizing the power required to translate the head along the arm and which is accomplished in this instance by means of the duplex arranged hand wheels 33, shaft 34, gears 35 and 36, the latter of which, meshes with teeth of a rack 37 carried on the inner side of the arm where it is impossible for any dirt or other foreign material to collect and interfere with the traversing mechanism.

The semi bi-tubular arm also is a departure from conventional design and is so constructed as to provide additional strength and is, therefore, less liable to deflection or distortion under heavy loads. Each side of the arm provides ample room for enclosing the arm shaft or other driving mechanism as well as a chamber or chambers of ample proportions for the reception of coolant, lubricant for the gears or shafting, or a reservoir for the propelling fluid, if desired.

Fig. 2 illustrates more clearly the narrow proportions of the arm and head whereby the operator may closely approach the spindle from either side and thereby is enabled to exercise accurate supervision over the tooling operations and is enabled to manipulate the controls in an easy and efficient manner. Either side of the machine being the control side saves the time of the operator in passing from one side to the other and which doubles the utility of the machine and increases its productive capacity.

*Feed control*

The feed control mechanism illustrated more particularly in Figs. 3, 4, 5, 6 and 14 will now be explained. As heretofore mentioned, the feeding of the spindle is effected by hydraulic means and which is controlled by suitable valves, later to be explained in detail. Suffice it for the present that the direction control valve is actuated by a vertically arranged shaft 40 which has annular rack teeth 41 formed near its lower end. The teeth 41 are engaged by the gear teeth of arcuate members 42 and 43 which are pivoted at 44. Manually operable levers 45 and 46, projecting outwardly on either side of the head, control the position of the valve rod 40 and the positioning of the valves. Shifting of the valve rod is also effected automatically by means of the lever 47 and controller shaft 48 as will now be explained.

The spindle sleeve 17ª is provided with rack teeth 49 that drives a pinion 50 in mesh with a gear 51 secured to a sleeve journaled coaxially with the controller shaft 48. The other end of the sleeve has gear teeth 52 formed thereon which mesh with the teeth of a gear 53 keyed to a drum 54. Gear 53 and drum 54 are retained in place by means of the studs 55 and 56. The drum 54 carries a plate member 57 rotatably mounted in grooves provided by a rotatable disk 58 and which is provided with graduations or indicia marks formed on the outer face thereof for indicating the stroke of the spindle.

The disk 58 revolves in bearings provided by the housing 59 and has secured thereto a feed trip dog Y which is effective in one direction only, that is, when the spindle is feeding down. When the spindle is moving downwardly the dial plate 58, which has been clamped by means of the hand screw 60 to the disk 57 in a preselected position, is turning clockwise as viewed in Fig. 1, whereupon the dog Y will engage a rock cam 61 to trip out the feed and reverse the direction of movement of the spindle when the proper depth is reached. A push pin 62 maintains the dog Y in an operative position as shown in Fig. 6.

Coaxial with the drum 54 is a disk or a plate 63 that carries a stop dox X which is mounted on the inner face of the plate and so positioned as to directly engage the controller rod 48 and move it to the neutral or stop position at preselected intervals. The disk 63 is clutched to the disk 57 by means of the gear teeth 64 and wide faced gear 65 so that any movement of the spindle causes rotation of all of the members 57, 58 and 63 and the trip dogs carried thereby.

The gear 65 is pressed inwardly by means of the hand grasp 66 and thereby declutched from the disk 57. It may then be turned in either direction until the pointer 67 carried thereby coincides with the proper graduation on the dial 57, and then released. The dog X being adjustable in this manner limits the height or extent of upward movement of the spindle.

It will be noted that short levers 73 and 74 are provided on the end of the rocker shaft which engage the under surface of a collar 75 carried by the latch pin. Resilient means such as a spring 76 fitted within the bore in the latch pin urges the latter downwardly against or into the path of movement of the controller rod 48 and also maintains the collar 75 into engagement with the two levers of the rocker arm. However, if the controller 48 is in the position b, Fig. 14, when the emergency arises to reverse and stop the spindle immediately, the operator raises the control lever 45 and the shaft 48 moves to the position d, the valves are then positioned so as to direct fluid to the opposite end of the motor M and the spindle recedes rapidly. As it nears its uppermost position, the dog X engages the end of the controller shaft and moves same to the stop position indicated in Fig. 5 or position c Fig. 14.

The reversing dog Y is also adjustable for regulating and controlling the depth of hole or duration of feed. This adjustment is readily effected by releasing the clamp screw 60 and by turning the dial plate 58 until the proper indicia mark thereon coincides with a zero mark carried by a frame 59. The dial plate 58 is then clamped to the drum 57 and the machine is again ready for operation.

Hydraulic system

This invention presents an improvement over the hydraulic systems heretofore designed for the propulsion of machine elements and one that may be incorporated in the motor discharge line or the supply line. It is recognized that hydraulic systems of the discharge regulated type have numerous advantages over the other type of system, the supply regulated type, one of them being that overrunning of the tool or work carrier is prevented because the carrier cannot accelerate or move any faster than the rate at which fluid is discharged from the motor. However, if a throttle is placed in the discharge line or the back pressure line, it has been found that an increase in the work resistance encountered by the motor effects a corresponding reduction in the pressure in the exhaust side thereof and an increase in the pressure in the supply or forward pressure lines. The converse is true when the work resistance decreases for under these circumstances there is a tendency for the hydraulic motor to accelerate and thereby produce an increase in the pressure in the back pressure lines. Consequently, the quantity of fluid passing the restricted opening or throttle will vary proportionately as the pressures, the resulting effect of which is to produce an unsteady, varying rate of movement of the propelled element.

Figure 15:
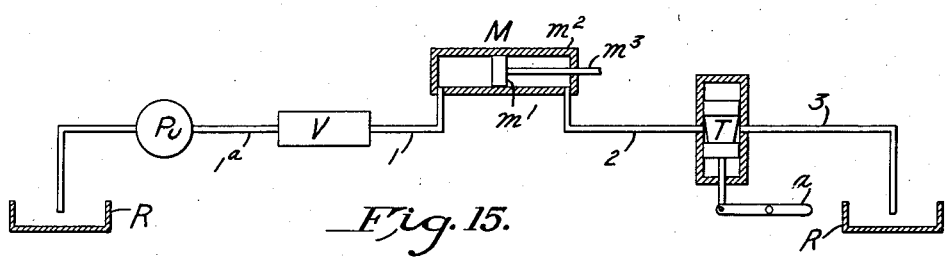

This invention undertakes to overcome and correct this undesirable action by providing an automatic variator for regulating and adjusting the size of the orifice in accordance with variations in the pressure of the controlled fluid thereby to produce an even and uniform rate of movement. Figs. 7, 12 and 13 represent a preferred form of a device responsive to variations in the fluid pressure for automatically maintaining a constant rate of feed, in combination with means for initially determining the rate of flow under a given pressure condition. The analytic diagram Fig. 15 represents an elementary or basic hydraulic circuit in which line 1 represents the forward pressure line or source of fluid supply and in which it may be desired to insert a selector valve V for selectively directing the fluid to either end of the hydraulic motor and may be actuated manually or automatically as herein explained. The fluid under pressure enters the motor M through conduit l and causes a relative movement to take place between the piston $m^1$ and the cylinder $m^2$; the motor discharge fluid, by reason of the relative movement, passes through line 2, through the restricted opening in the throttle valve T and thence to line 3 and the reservoir R. In this particular figure, the throttle valve T is representative of a conventional valve provided with a suitable control lever a and which, for certain kinds of installations or classes of machine tools, is entirely satisfactory for effecting an infinite range of feeds.

Figure 16:
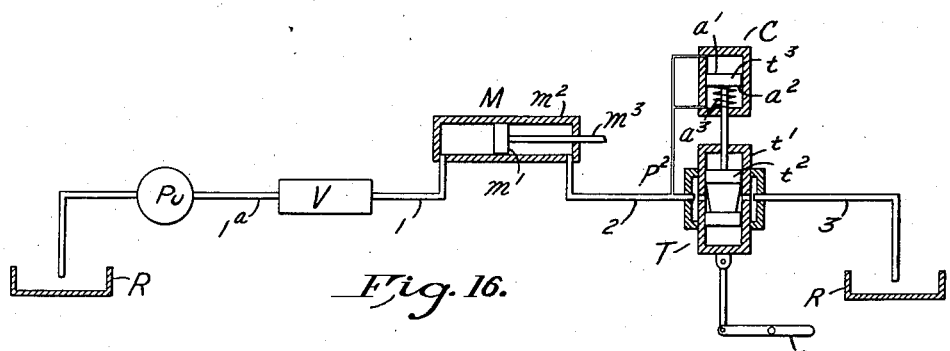

It is important, however, that means be provided for maintaining a constant rate of feed under varying values of work resistance and to this end the variator or compensator C is provided for automatically varying the effective size of the orifice in the throttle valve in accordance with changes in the work resistance. In principle the operation of the variator C is as follows:

Referring to the analytic diagram Fig. 16, the casing $t^1$ of the throttle valve T, illustrated as being adjustable by the hand lever a, is provided with a differential piston $t^3$ attached to the valve member $t^2$, each side of the piston $t^3$ being connected preferably to the back pressure line 2. Thus, if the pressure in the back pressure line be represented as $P^2$ and the respective areas in the differential piston $t^3$ as $a^1$ and $a^2$, then the forces tending to close the valve are $P^2 a^1$ and the forces tending to open the valve are $P^2 a^2$ plus the constant of a spring $a^3$, which, under a given pressure condition may be calibrated to maintain the valve in equilibrium. A variation from the selected pressure condition as by an increase in the work resistance produces a reduction in $P^2$ and since the quantity of fluid passing the throttle valve may be determined by the formula $$Q=\frac{P}{R}$$

where Q is the quantity, P, the pressure difference, and R, the resistance, it will be seen that a reduction in the pressure $P^2$ would tend normally to decrease the quantity of fluid passing the resistance of valve T, hence, a commensurate reduction in the feed rate results. However, since there will also be a corresponding change in the forces tending to keep the resistance valve in equilibrium, the valve becomes out of balance and moves toward an open position until the forces $P^2 a^1$ again equal the force $P^2 a^2 + a^3$ and in this way there is maintained a constant volume of flow through the throttle valve (uniform feed) regardless of the increases in the value of the work resistance.

Conversely, when there is a decrease in work resistance the back pressure $P^2$ increases and then there is a tendency for a larger quantity of fluid to pass the resistance T. The automatic variator C, however, compensates in the opposite direction and moves the valve so as to increase the resistance and to maintain the volume of flow of the discharged fluid constant, and again the rate of feed or travel of the driven element is maintained constant even though there is a drop in the work resistance.

Figure 17:
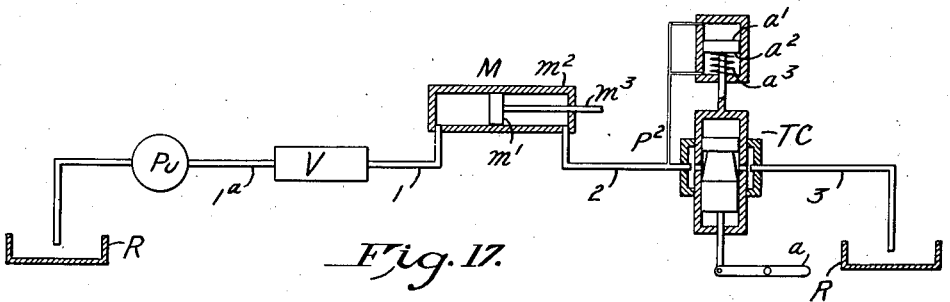
Figure 18:
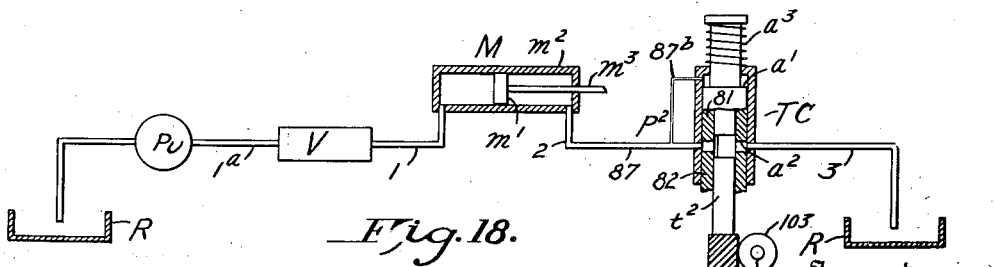

Fig. 17 is an analytic diagram of the compensating control valve but with the valve casing automatically adjustable in accordance with changes in the work resistance, Fig. 18 is similar in principle but depicts a rotary valve stem instead of the sliding valve stem, above described, and more nearly conforms to the preferred form illustrated in Fig. 7.

The preferred form of variator, comprises a casing 80 and a rotatable valve stem $t^2$ closely fitted within a bore formed in a sleeve-like member 81 and bushing 82. The sleeve 81 is provided at its lower end with projecting tines or tongues 83 which fit closely within slots 84 provided by the bushing 82. Resilient means such as a spring $a^3$, interposed between a collar 85 adjustably carried by a projecting portion of the sleeve 81, and a cover member 86, urges the sleeve outwardly thereby to increase the gap or aperture thus formed between the ends of the tongues 83 and the bottoms of the slots 84. Fluid discharged by the motor enters the gateway 87ª through the port 87 and flows around a reduced portion 88 of the valve stem $t^2$ and thence through the conduit 89 to the reservoir. The reduced portion 88 is eccentrically formed and lies adjacent the gates in the valve so that any angular movement of the valve stem will increase or decrease the resistance to the flow of fluid through these ports and thus control the rate of discharge from the motor.

Ordinarily, under a given condition of pressure, the rate of flow through the valve will be constant for any given setting of the valve stem. However, since the pressure of the regulated fluid varies with the work resistance, as hereinbefore explained, the quantity of fluid passing the resistance 88 will likewise vary and thereby cause variations in the rate of movement of the motor and parts associated therewith and to overcome this condition automatic means are provided for correcting or varying the size of the orifice in accordance with variations in the fluid pressure. With that end in view the sleeve 81 is formed with a reduced portion which provides an annular piston-like area $a^1$ and which is also connected with the back pressure line 87 by means of the conduit 87ᵇ. Fluid pressure entering the chamber 90 and acting upon the annular area $a^1$, tends to move the valve sleeve 81 in the direction closing the gateway 87ª, in opposition to the action of the spring $a^3$ and the fluid pressure acting upon the undersides of the tongues 83.

With respect to a given pressure condition, the effective areas of the surfaces $a^1$ and $a^2$ and the characteristic of the spring $a^3$ may be calculated or adjusted to maintain the valve sleeve in equilibrium thereby to maintain a given size opening at 87ª. Any variation in the fluid pressure occurring thereafter will immediately unbalance the valve and cause the sleeve 81 to move and vary the opening 87ª until a state of equilibrium is again reached. Thus, if the fluid pressure in the conduit 87, and shunt line 87ᵇ increases the resultant of the forces acting upon the valve sleeve 81 moves the latter in a direction tending to close the aperture 87ª, the effect of which is to maintain constant a given volume of fluid discharged from the exhaust side of the motor even though the pressure increases. Conversely, if the pressure in the back pressure lines 87 and 87ᵇ drops, the valve sleeve 81 is again thrown out of equilibrium and moves in a direction tending to open the port, to bring about a constant discharge at the lower pressure. It will be seen, therefore, that the foregoing mechanism, although it performs a complicated service, is extremely simple, reliable and entirely automatic in the performance of its function in maintaining an even and uniform rate of feed.

The selector valves are, to facilitate the machining and assembling of parts, housed in the same casing 80 as the variator mechanism just described, the essential parts being the valve plungers 91 and 92 and valve sleeves 93 and 94. The valve plunger 91 is provided with three reduced portions 91ª, 91ᵇ and 91ᶜ which terminate in the raised lands 91ᵈ, 91ᵉ, 91ᶠ, and 91ᵍ, while the valve plunger 92 is provided with two reduced portions 92ª and 92ᵇ and the lands 92ᶜ, 92ᵈ and 92ᵉ. The valve sleeve 93 is provided with radial bores or channels 93ª, 93ᵇ and 93ᶜ which are adapted in certain positions in the valve stem 91, to be placed in communication with similar ports 94ª, 94ᵇ and 94ᶜ of the adjacent valve sleeve, to effect a preselected rate or direction of movement of the drill spindle.

Forward traverse

Fig. 8 illustrates diagrammatically the position of the valve when the spindle is approaching the work. Fluid under pressure passes from the pump Pu through conduit 1ª to chamber 93ᵇ, around a reduced portion 91ᵇ of the valve stem, to chamber 93ᶜ thence through the forward pressure line 1 to the larger end of the slidable cylinder $m^2$ whereupon the latter is caused to move forward or toward the work at a relatively rapid rate. Fluid discharged by the smaller end of the cylinder passes through line 2, channel 94ª, around reduced portion 92ª, to channel 94ᵇ, and thence through conduit 95 to the reservoir. A pressure relief valve 96 is placed in this line to maintain the system charged and to provide sufficient back pressure to prevent undue acceleration or overrunning of the parts.

Feed

So long as the operator continues to hold the control lever in the rapid traverse position the spindle moves at a relatively rapid rate as the work is approached. However, the lever is then moved to the feed position which shifts the valves to the position illustrated in Fig. 7 and in this figure the valves have been moved into the sleeves one step. The pressure fluid from the pump Pu now passes through channel 93ᵇ around reduced portion 91ᵇ to the larger end of the motor in the same manner as explained during the "approach" position of the valves. The fluid discharged by the motor, instead of passing to the reservoir through the check valve 96, passes through conduit 2, channel 94ª, to channel 93ª, which, during this position of the valve stem 91 is in communication with the conduit 87 previously referred to. The back pressure fluid is thereby directed through the throttle valve TC, as hereinbefore explained, and out conduit 89 to the reservoir.

A hand wheel 100 located on each side of the tool head provides the means for adjusting the angular position of the rate control valve stem $t^2$, as follows: The lower end of the valve stem $t^2$ is secured to a shaft 101 which is provided intermediate its ends with spiral gear teeth 102. A similar gear 103 carried by the rate control shaft 104 meshes with the gear teeth 102 to effect rotation of the valve stem to vary the value of the resistance at 88. A pointer 105 carried by the hand wheel 100, in combination with a suitable dial plate, indicates the various settings required to effect preselected rates of feed.

Return traverse

To bring about a return movement of the tool head, the valves are automatically positioned, as shown in Fig. 9, and pressure fluid passes through channel 93$^b$, reduced portion 91$^b$, channel 93$^a$ to channel 94$^a$ to conduit 2 and the smaller end of the cylinder $m^2$, whereupon the cylinder $m^2$, and parts associated therewith, are retracted at a rapid rate. The fluid discharged from the opposite end of the cylinder during this period passes back through line 1, channel 93$^c$, around reduced portion 91$^c$, through channel 94$^c$, around reduced portion 92$^b$, to channel 94$^b$ and then, through line 95 and relief valve 96, to the reservoir.

Stop

The spindle continues its upward movement until the trip mechanism again operates to shift the valves to the "stop" position indicated by Fig. 10. Fluid under pressure passes through line 1$^a$ through channels 93$^b$, 93$^c$, and line 1 to the larger end of the motor and also through channel 94$^c$, around reduced portion 92$^b$, through channel 94$^b$, to the exhaust line 95. It will be noted that in this position of the valves the fluid is entrapped in the discharge side of the motor, that is, conduit 2 leads into channels 94$^a$ and 93$^a$, but as these are closed off from all other means of exhaust there is no flow of fluid out of the motor discharge line and the parts are held at rest. A relief valve 97 placed in the forward pressure line prevents the pressure therein from exceeding the predetermined maximum in the event of an unforeseen accident.

Operation

At the start of the operations the machine is at rest and the parts are in neutral or stop position as illustrated in Figs. 3, 5 and 10. The operator loads the machine and moves the control lever 45 downwardly to its extreme position. This movement, through the mechanism heretofore explained, shifts the valves to the position diagrammatically illustrated in Fig. 8 and fluid is thereby directed to the larger end of the hydraulic motor and the spindle moves toward the work at a rapid traverse rate. The operator continues to hold the lever down until the tool carried by the spindle is about to enter the work at which time the lever is moved upwardly one position, the "feed" position. The valves then are moved, as shown in Fig. 7, and the fluid from the exhaust side of the motor is directed through the variator, thus materially reducing the rate of movement of the spindle. At this time the controller or plunger 48, which, during the rapid traverse position of the valves was retracted to the position $a$, (Fig. 14, now advances to the position $b$ against the pawl $p$. Rapid traverse movement of the spindle stops and the spindle continues forward at a slow rate or the feed rate selected until the dog Y, which has been previously set for the depth hole required, engages the rocker mechanism and elevates the tripping pawl $p$ so that the controller or plunger 48 advances to the position $d$, illustrated diagrammatically in Fig. 14. The advancing of the controller to this position moves the valves to the reversing position illustrated in Fig. 9, thereby reversing the fluid connections to the motor and the spindle recedes rapidly. The dial plate 63 also reverses until the dog X engages the end of the plunger rod 48 and moves the same to a position $c$, Fig. 14, permitting the latch-pawl to drop into the notch formed at the end of the plunger.

When moved to this position, the valves are likewise moved to a position shown in Fig. 10, thereby blocking the motor discharge and by-passing the supply fluid to the reservoir. Hence the spindle comes to rest at the upper end of its stroke.

In the event that it becomes necessary for the operator to reverse the movement of the spindle before the desired depth hole is reached, all that is necessary to be done is to elevate the control lever to its uppermost position which shifts the shaft 48 to position $d$ and the valves to the rapid traverse reverse position illustrated in Fig. 9, the spring 47$^b$ dominates the spring of the latch-pawl $p$ so that the controller 48 does not stop in its neutral position.

The lost motion connection 47$^a$, between lever 47 and controller 48, permits independent operation of the levers for reversing when dog X is in line with shaft 48, while resilient means such as the spring 47$^b$ normally maintains the parts in their effective operating positions during the ordinary manipulation of the controls.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of United States:—

1. In an hydraulic transmission system of the discharge regulated type for propelling an element against a variable resistance, the combination of an hydraulic motor, a source of pressure fluid supply; a conduit system between said motor and said supply, one of the conduits of said system being the motor intake conduit and another conduit of the system being the motor discharge conduit; a valve in said discharge conduit for controlling the flow therethrough and thereby rate of movement of said motor, means for adjusting the setting of said valve comprising a hand controlled means for setting the valve to cause a predetermined flow therethrough under a given pressure condition, thereby a preselected rate of movement of said motor; and means connected with said valve and responsive to changes in the pressure in the said discharge conduit automatically to change the said setting of the valve inversely proportionately to the said changes in pressure to maintain said preselected rate of movement constant despite the variation in pressure caused by the variations in resistance to motor movement.

2. A machine tool combining, a movable member; hydraulic means for effecting movement thereof selectively in reverse directions comprising an hydraulic motor, a source of fluid pressure, a system of fluid conduits including a motor intake and a motor exhaust conduit and valve means having a forward position a reverse position and a stop position in which it definitely closes one side of said motor to intake and exhaust, for selectively directing fluid to said motor to effect movement thereof in forward or reverse directions or to stop the movement thereof; power means normally tending to shift said valve to a position effecting a reverse movement of said motor; manual means for shifting said valve to a position effecting a forward movement of the motor; latch means for maintaining said valve in said last mentioned position; means actuated by the movement of said member for releasing said latch means thereby to render effective the said means normally tending to shift the valve to a reverse position; and means actuated by said member on the reverse movement thereof to shift said valve in opposition to said power means to its stop position thereby to stop the movement of the member by definitely closing said one side of the motor.

3. A drilling machine combining, a movable spindle; hydraulic means for effecting movement of said spindle, comprising an hydraulic motor, a source of fluid under pressure, a system of fluid conduits, and valve means for selectively directing fluid to, from, and for cutting off the fluid pressure to the motor thereby to stop same; means for shifting said valve; latching mechanism for maintaining said valve normally in the position in which fluid under pressure is cut off from the motor; manual means including a lost motion device for shifting the valve in opposition to said latch mechanism to open the motor to said fluid pressure thereby to effect a movement of said spindle; means controlled by the movement of said spindle for releasing said latch mechanism at predetermined times, one of said times being to effect a reversal in the movement of said motor and thereby said spindle at a predetermined point in the forward movement thereof; and means controlled by the movement of said spindle to shift said valve means to said position in which fluid under pressure is cut off from the motor when said spindle reaches a predetermined position thereby to stop the movement of the spindle.

4. In a transmission for producing relative movement between machine tool elements the combination of an hydraulic motor operatively connected with said elements, a power source, a pump driven from said source and adapted to deliver fluid under pressure to said motor, fluid conduits connecting said pump and motor, one of said conduits being the motor intake conduit and one of said conduits being the motor discharge conduit, a rate controlling valve in the said discharge conduit, control means for said valve comprising hand control means for setting the said valve to cause a predetermined flow therethrough under a given pressure condition, thereby to cause a preselected rate of relative movement, and means connected with said valve and with said discharge conduit responsive to variations in the pressure in said discharge conduit automatically to change the said setting of the valve inversely proportionate to said changes in pressure, thereby to maintain said preselected rate of relative movement constant.

5. An hydraulic system for propelling an element against a resistance combining an hydraulic motor; a pump for supplying fluid under pressure to said motor; a conduit system including a forward pressure line and a return pressure line connected with said motor, means in the said return line for controlling the rate of flow therethrough and thereby the speed of movement of said motor comprising a valve, manual means for setting said valve to cause a predetermined rate of flow in said return line under a given pressure condition therein, and means connected with said valve and with said return line responsive to variations in the pressure of the fluid in the return line for changing automatically the said setting of the valve independently of said manual means, for maintaining the rate of flow through the valve constant irrespective of the variations in fluid pressure in said return line.

6. An hydraulic system for propelling an element of a machine tool against a variable work resistance at a constant rate and in which variations in the work resistance causes variations in pressure in the system combining an hydraulic motor operatively connected with the element to be propelled, a pump for supplying liquid under pressure to said motor; a motor discharge conduit; means located wholly in said discharge conduit for controlling the flow therethrough and thereby the rate of movement of said motor comprising a control valve, manual means for setting said valve to cause a predetermined rate of flow therethrough under a given pressure condition existing in the conduit, auxiliary means responsive automatically to variations in the pressure in said discharge conduit and connections between said auxiliary means and said valve to vary the said setting of the valve to maintain said predetermined rate of flow constant under varying conditions of pressure.

7. A power transmission combining an hydraulic motor and a pump; a system of conduits connecting said motor and pump; valve means provided with a variable orifice for adjustably controlling the flow of fluid through one of said conduits thereby to control the rate of movement of said motor; manual means for adjusting the size of said orifice to effect a predetermined flow through the valve under a given condition of pressure; and means responsive to variations in the pressure of the fluid in said last named conduit for automatically changing the size of said orifice in a ratio inversely proportionate to the said changes in pressure to maintain said predetermined volume of flow therethrough constant under varying conditions of pressure of the fluid in said conduit.

8. In a variable speed hydraulic transmission system adapted to be subjected to variations in load which causes variations in the fluid pressure in the system comprising a motor, a system of fluid conduits connected with said motor, a source of fluid pressure connected with said conduits and a valve for controlling the flow of fluid in said system, the combination of a rate control valve serially connectible in one of said conduits comprising a valve casing having fluid intake and discharge ports connected with said last named conduit; a sleeve member movable in said casing and having one end thereof in proximity with said intake and discharge ports and the other end subjected to the presure of said intake port, a valve stem rotatably journaled in said sleeve and being formed with a reduced portion adjacent the first mentioned end of said sleeve varying in cross-sectional diameter adapted when moved to a given angular position therein to establish communication between said intake and discharge ports thereby permitting a flow through said ports at a predetermined rate; manual means for initially adjusting the effective position of said reduced portion with respect to said ports to control the degree of valve opening and thereby to control the rate of flow therethrough; and piston means connected with said sleeve and with said discharge conduit responsive to an increase in the pressure of the fluid at the valve intake port for shifting the said sleeve axially with respect to said reduced portion to decrease the effective opening of the valve thereby to maintain the rate of flow therethrough constant irrespective of the rise in pressure in said conduit.

9. An hydraulic transmission system adapted to be subjected to variable loads combining an hydraulic motor; a pump; a system of fluid conduits, including a motor discharge conduit, between said pump and motor; valve means in said discharge conduit provided with a regulatable orifice for controlling the flow of fluid from the motor, said valve orifice being adapted to be initially adjusted to a size to permit a predetermined flow through the conduit under a given condition of pressure, and means connected with said valve and responsive automatically to variations in the pressure of the fluid in the motor discharge conduit to decrease the size of said orifice in proportion to increases in the pressure in said conduit to maintain the flow through the conduit constant under varying conditions of pressure.

10. In an hydraulic system for a machine tool of the discharge regulated type in which variations in the resistance encountered effect variations in the pressure of the liquid in the system, the combination of an hydraulic motor; a pump for supplying fluid thereto; a reservoir; a selector valve; a system of fluid conduits connecting said motor, pump, valve and reservoir, said system including a discharge conduit having a relatively low fixed resistance therein and a discharge conduit having a variable resistance therein; means for initially setting the value of said variable resistance to effect a predetermined rate of flow therethrough; other means responsive automatically to variations in the pressure of the fluid in the discharge side of said motor for varying the said initial setting of said variable resistance to maintain said predetermined rate of flow; and means selectively to direct fluid discharged by said motor through either of said discharge conduits.

11. An hydraulic transmission combining an hydraulic motor; a pump mechanism adapted to supply liquid to said motor selectively to opposite sides thereof to propel same; a liquid reservoir; a system of fluid conduits between said pump, motor and reservoir; selector valve means in said system for controlling the direction of movement of said motor; a high resistance fluid conduit and a low resistance fluid conduit connectible with the discharge side of said motor; said selector valve means having a portion thereof serially connectible with said pump and motor selectively to direct liquid to opposite sides of the motor, and a portion thereof serially connectible with said motor and reservoir selectively to direct fluid discharged from the motor to the reservoir through said low resistance conduit or through said high resistance conduit; means to shift said selector valve means; and means responsive to variations in the pressure of the fluid in the discharge side of said motor for varying the value of the resistance in said high resistance conduit when said last mentioned conduit is rendered effective.

12. In an hydraulic system for a machine tool of the discharge regulated type in which variations in the resistance encountered effect variations in the pressure of the liquid in the system, the combination of an hydraulic motor; pump means for supplying liquid thereto; a reservoir; a system of fluid conduits connecting said motor, pump, and reservoir; said system including a conduit having a relatively low fixed resistance therein and a conduit having a variable and relatively high resistance therein; valve means in said system adapted to be positioned selectively to control the flow of liquid between opposite sides of said motor and said pump; means to position said valve to effect a flow of liquid through said low resistance conduit to effect a movement of said motor at a relatively rapid rate, or through said variable and relatively high resistance conduit to effect a movement of said motor at a relatively low rate; and means effective when said selector valve is positioned as to direct a flow through said high resistance conduit to vary the value of the resistance therein in accordance with variations from a given pressure condition of the controlled fluid.

LAWRENCE LEE SCHAUER.
AUGUSTUS M. SOSA.
JOHN H. McKEWEN.